US006194711B1

(12) United States Patent
Tomita

(10) Patent No.: US 6,194,711 B1
(45) Date of Patent: Feb. 27, 2001

(54) SCANNING NEAR-FIELD OPTICAL MICROSCOPE

(75) Inventor: Eisuke Tomita, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/038,259

(22) Filed: Mar. 10, 1998

(30) Foreign Application Priority Data

Mar. 12, 1997 (JP) ...................................................... 9-058013

(51) Int. Cl.⁷ ............................ G12B 21/06; G12B 21/20
(52) U.S. Cl. ........................................... 250/234; 250/216
(58) Field of Search ..................................... 250/216, 234, 250/306, 235, 307; 359/385, 393; 73/105

(56) References Cited

U.S. PATENT DOCUMENTS

| 4,851,671 | | 7/1989 | Pohl ....................................... | 250/306 |
| 5,254,854 | * | 10/1993 | Betzig ................................... | 250/234 |
| 5,574,278 | * | 11/1996 | Poirier .................................. | 250/306 |
| 5,623,295 | * | 4/1997 | Kishi et al. ........................... | 250/306 |
| 5,636,035 | * | 6/1997 | Whittaker ............................. | 356/437 |
| 5,641,896 | * | 6/1997 | Karrai ................................... | 250/306 |
| 5,693,938 | * | 12/1997 | Marchman et al. .................. | 250/234 |
| 5,767,514 | * | 6/1998 | Lloyd ................................... | 250/306 |
| 5,894,122 | * | 4/1999 | Tomita .................................. | 250/234 |

FOREIGN PATENT DOCUMENTS

| 19510368 | | 11/1995 | (DE) . |
| 19524907 | | 1/1997 | (DE) . |
| 50750 | * | 10/1981 | (EP) . |
| 291310 | * | 11/1988 | (EP) . |
| 2289759 | | 11/1995 | (GB) . |
| 2290656 | | 1/1996 | (GB) . |
| 8-94650 | * | 4/1996 | (JP) . |

OTHER PUBLICATIONS

Karrai et al., Piezoelectric tip–sample distance control for near field optical microscope, Applied Physics Letters, vol. 66, No. 14, pp. 1842–1844, Apr. 3, 1995.*
Design and implementation of a low temperature near–field scanning optical microscope, Review of Scientific Instruments, vol. 65, No. 3, pp. 626–631, Mar. 1995.*
Patent Abstracts Of Japan, vol.017, No.596 (P–1636), Oct. 29, 1993 (English Translation).
Patent Abstracts Of Japan, vol.015, No.079 (P–1170), Feb. 25, 1991 (English Translation).
Grober R.D. et al., "Design and Implementation of a Low Temperature Near–field Scanning Optical Microscope", Review of Scientific Instruments, American Institute of Physics, New York, vol.65, No.3, Mar. 1994, pp. 626–631.
P. Gunther et al., Scanning Near–Field Acoustic Microscopy, Applied Physics Letters, B 48, pp. 89–92, 1989.

* cited by examiner

Primary Examiner—John R. Lee
(74) Attorney, Agent, or Firm—Adams & Wilks

(57) ABSTRACT

A scanning near-field optical microscope has an optical waveguide probe, a vibration device having a piezoelectric vibrating body and an AC voltage generator for vibrating the probe relative to a surface of a sample. A vibration detecting device has a quartz oscillator and a current/voltage amplifier circuit for detecting vibration of the probe. A resilient body biases the probe into pressure contact with the quartz oscillator. A coarse displacement device effects coarse displacement of the probe to bring the probe close to the surface of the sample. An optical detection device has lenses and a photodetector for detecting light from the sample. A sample-to-probe distance control device has a fine displacement adjustment device and a servo circuit for effecting fine displacement of the probe in the Z direction. A two-dimensional scanning device having a fine displacement device and a scanning circuit scan the probe in X and Y directions. A data processing device converts a measurement signal from the photodetector into a three-dimensional image.

52 Claims, 7 Drawing Sheets

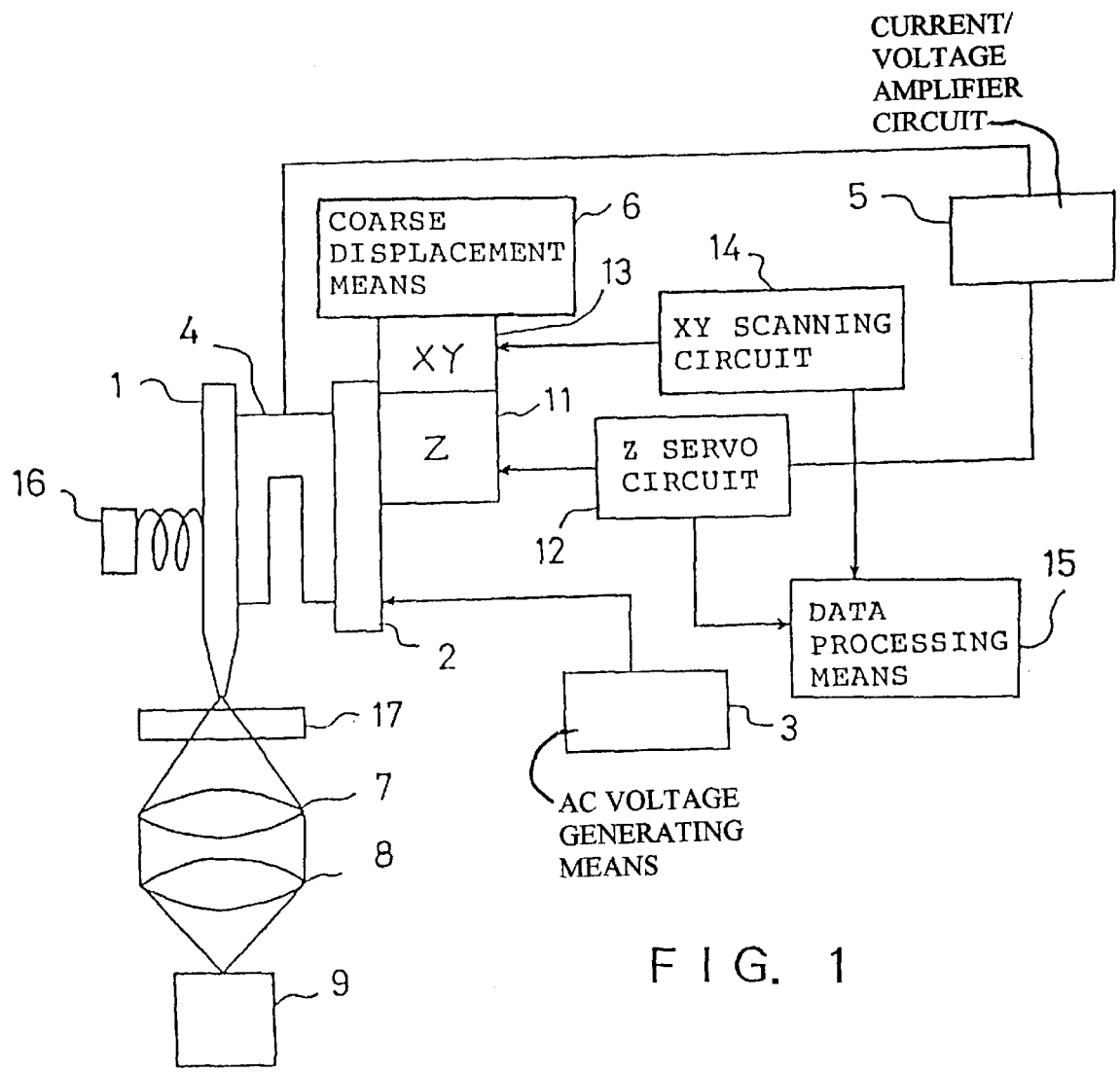
F I G. 1

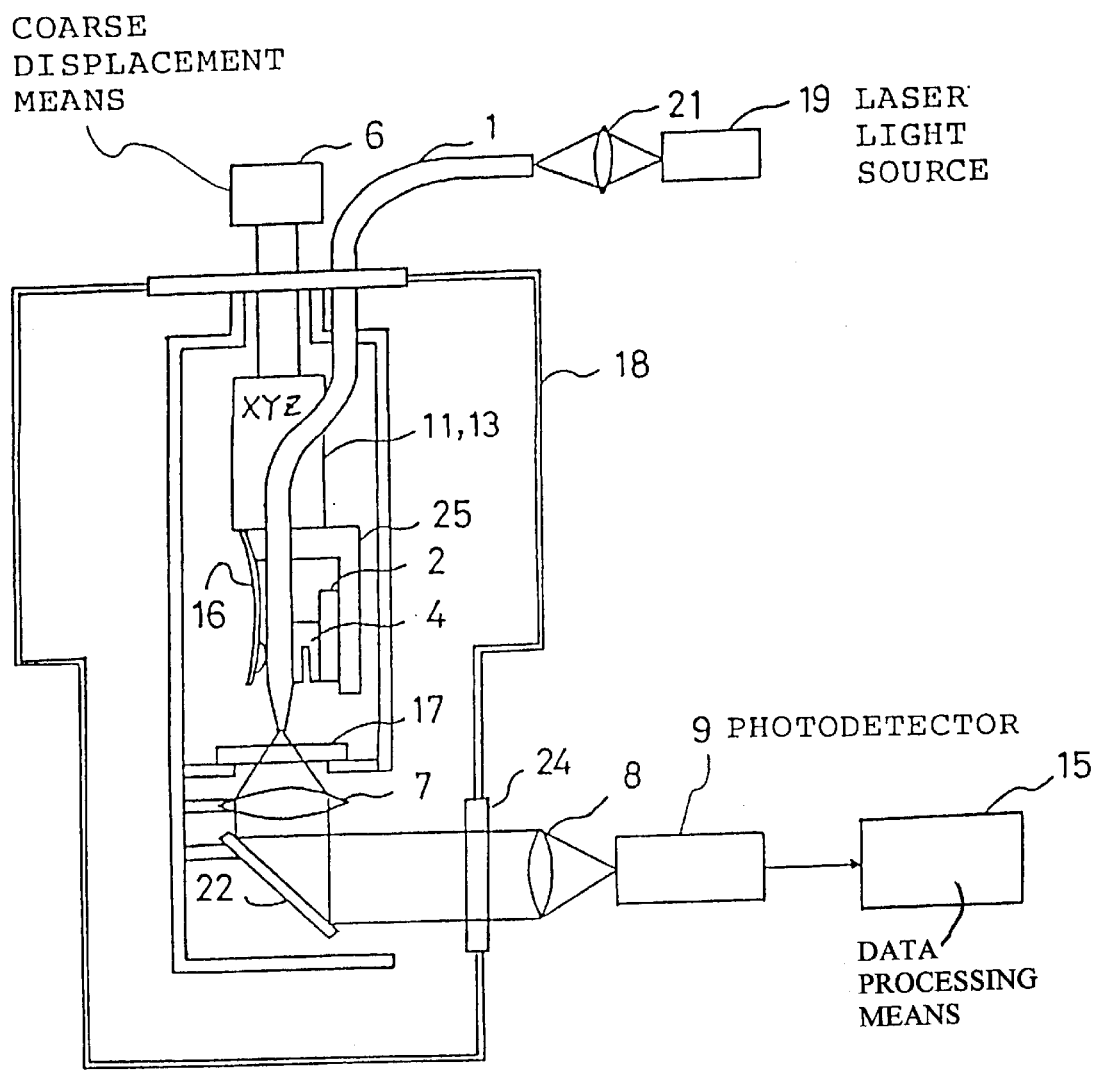
F I G. 5

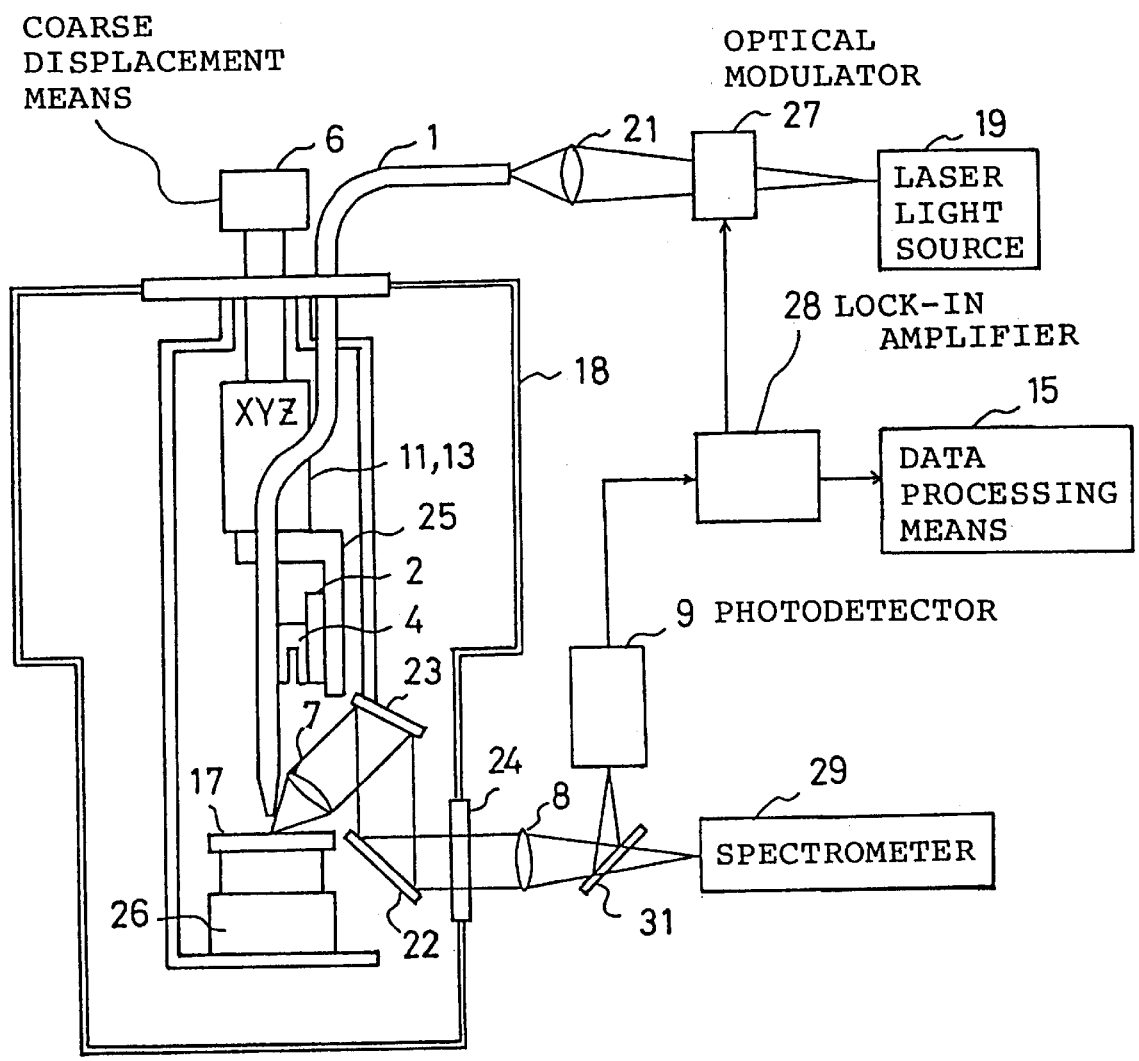
F I G. 7

SCANNING NEAR-FIELD OPTICAL MICROSCOPE

BACKGROUND OF THE INVENTION

The present invention relates to a scanning near-field optical microscope having an optical resolution less than the wavelength and, more particularly, to a scanning near-field optical microscope for observing locally excited emission of light from a semiconductor device or the like under a low-temperature condition.

A so-called scanning near-field optical microscope has been known as an optical microscope having an optical resolution less than the wavelength. Examples of this kind of microscope are disclosed in Patent Unexamined Publication No. 291310/1992, entitled, "Near-Field Scanning Optical Microscope and its Applications", by Robert Erik Betzig and in Patent Unexamined Publication No. 50750/1994, entitled, "Scanning Microscope Including Force-detecting Means", by Robert Erik Betzig. An example of a low-temperature near-field optical microscope capable of cooling a sample is disclosed in Rev. Sci. Instrum. 65(3), 1994, pp. 626–631, by Robert D. Grober et al. An example of a near-field optical microscope using a quartz oscillator is disclosed in Appl. Phys. Lett. 66(14), 1995, pp. 1842–1844, by Kaled Karai et al. These instruments are outlined below.

The near-field scanning optical microscope is also known as NSOM. FIG. 2 is a schematic view of the prior art near-field scanning optical. microscope. The tip of an optical fiber 310 is machined into a tapering form, 70. An aperture less than the wavelength is formed at the tapering tip of the probe. A sample stage 20 is placed on an XYZ stage 50. A sample 30 is set on the sample stage. It is held close to the sample surface, using an XYZ fine motion device 40, and a certain region is raster-scanned. The optical fiber probe 70 is moved parallel to the sample surface, using a fine motion device 40. A horizontal force from the sample surface, or a shear force, acts on the tip of the probe. Thus, the state of the vibration of the probe varies. To measure the state of vibration of the probe 70, laser light (not shown) used for position control is directed at the tip of the probe, and the shadow of the probe 70 is directed through a pinhole 120 by a lens go and detected by a photomultiplier 110 of a position sensitive detector 80. The distance between the sample surface and the tip of the probe is controlled, using the fine motion device 40, so that the shear force is kept constant, i.e., the rate at which the amplitude or phase varies is kept constant. The shear force drops rapidly with the distance from the sample. Utilizing this, the distance between the sample surface and the tip of the probe is kept constant on the order of nanometers. Under this condition, laser light from a laser light source 60 is introduced into the fiber 310, using a lens 150, to illuminate the sample surface from the aperture at the tip. A part of light reflected or transmitted is detected by conventional optics (not shown). As described thus far, the resolution of NSOM depends on the size of the aperture at the tip of the probe. Since it is easy to form apertures less than the wavelength (e.g., less than 100 nm), high resolution less than the wavelength can be realized.

FIG. 3 is a schematic view of the prior art near-field optical microscope. C is a sample and a piezoelectric scanner for scanning the sample. D is an optical fiber probe and a piezoelectric device for vibrations. The optical fiber probe is machined into a tapering form and formed with an aperture less than the wavelength at its tip. The optical fiber probe is vibrated parallel to the sample surface, using the piezoelectric device for vibrations. A horizontal force from the sample surface, or a shear force, acts on the tip of the probe. Thus, the state of the vibration of the probe varies. To measure the state of vibration of the probe, laser light (not shown) is used. A is a diode laser. B is a lens. F is a photodiode detector. Laser light for position control is directed at the tip of the optical fiber probe. The shadow of the probe is detected by the lens and the detector.

The distance between the sample surface and the tip of the probe is controlled, using the piezoelectric scanner C, so that the shear force is kept constant, i.e., the rate at which the amplitude or phase varies is kept constant. The shear force drops rapidly with the distance from the sample. Utilizing this, the distance between the sample surface and the tip of the probe is kept constant on the order of nanometers. Under this condition, laser light (not shown) used for near-field optical measurement is introduced into the fiber D, to illuminate the sample surface from the aperture at the tip. A part of reflected light is detected by conventional optics (not shown). The resolution depends on the size of the aperture at the tip of the probe. Since it is easy to form apertures less than the wavelength (e.g., less than 100 nm), high resolution less than the wavelength can be realized. A cryostat is used to cool the sample. E is a chamber and an optical window in the cryostat. By placing the sample inside the cryostat, the sample can be cooled down to liquid helium temperature. This structure permits near-field optical measurement while the sample is cooled.

FIG. 4 is a schematic view of the main portion of the prior art "near-field optical microscope using a quartz oscillator." Indicated by 400 is an optical fiber probe. Indicated by 410 is a quartz oscillator. The optical fiber probe is adhesively bonded to the quartz oscillator, which is made to resonate by a piezoelectric device (not shown) for vibrations. Vibration of the quartz oscillator vibrates the optical fiber probe. As the tip of the probe comes close to the sample, a horizontal force from the sample surface, or a shear force, acts on the tip of the probe, thus varying the state of vibration of the quartz oscillator. The state of vibration of the quartz oscillator is measured by measuring electric charge generated by the piezoelectric effect of the quartz. The distance between the sample surface and the tip of the probe is controlled, using a piezoelectric scanner (not shown), so that the shear force is kept constant, i.e., the rate at which the amplitude or phase varies is kept constant. The shear force drops rapidly with the distance from the sample. Utilizing this, the distance between the sample surface and the tip of the probe can be kept constant on the order of nanometers.

The prior art scanning near-field microscope described above has the following disadvantages. In near-field scanning optical microscopy (NSOM), laser light is directed at the sample surface near the tip of the optical probe, and an image (shadow) of the tip of the probe is detected from the reflected light to detect the shear force. Therefore, the amount of reflected light is readily affected by the topography of the sample surface and by the reflectivity. Hence, it is difficult to measure the amplitude of vibration, and it is difficult to precisely measure the surface contour. Furthermore, it is not easy to align the laser light and so the data reproducibility has posed problems. Furthermore, the measured region on the sample surface is illuminated with the laser light used for detection of the shear force, as well as with exciting light from the optical probe. This increases the background noise. Additionally, it is difficult to remove the noise. In spectroscopic measurement, it is impossible to measure wavelengths close to the wavelength of the laser light used for the shear force. Moreover, an optical fiber or the like is necessary to remove the laser light used for the shear force. This leads to a decrease in the amount of emitted light contributing to detection. As a result, the SIN of the data deteriorates.

The low-temperature scanning near-field optical microscope uses laser for detection of a shear force in the same way as the above-described near-field scanning optical microscope (NSOM). This makes it difficult to measure the amplitude of vibration. In addition, it is difficult to measure the surface topography precisely. Furthermore, it is not easy to align the laser light. Data is reproduced with insufficient reproducibility. Furthermore, the measured region on the sample surface is illuminated with the laser light used for the shear force, as well as with exciting light from the optical probe. This increases the background noise. In spectroscopic measurement, it is impossible to measure wavelengths close to the wavelength of the laser light used for the shear force. Moreover, an optical fiber or the like is necessary to remove the laser light used for the shear force. This leads to a decrease in the amount of emitted light contributing to detection. As a result, the SIN of the data deteriorates. The sample is positioned inside the cryostat, while the optics including the laser light for detection of a shear force is placed outside the cryostat. Therefore, the optical window tends to attenuate the amount of laser light. In consequence, the measurement is rendered difficult. Additionally, flow of low-temperature helium gas or liquid helium tends to cause the laser light to fluctuate. Consequently, it is difficult to control the position of the optical probe. Further, it is difficult to remove the aberration, because a light-gathering system using reflective mirrors is used. As a consequence, blurring of the image has presented problems.

In the near-field optical microscope using a quartz oscillator, the portion where the quartz oscillator and the optical fiber are adhesively bonded together tends to be a microscopic region (e.g., a square region about 100 m square). It is difficult to perform the bonding operation. Furthermore, the characteristics of the quartz oscillator device are easily affected by the amount of adhesive, the hardness, the location at which they are bonded, and other factors. Thus, it is difficult to obtain an oscillator sensor with high reproducibility. For these reasons, it has been difficult to use the instrument in industrial applications. Where the optical probe is replaced, the quartz oscillator must also be replaced. This gives rise to an increase in the cost. In addition, near-field optical measurement with high reproducibility has been impossible to perform.

SUMMARY OF THE INVENTION

A scanning near-field optical microscope in accordance with the present invention has an optical waveguide probe provided with a microscopic aperture portion of a diameter less than a wavelength at its tip, a vibration application portion consisting of a piezoelectric vibrating body and an AC voltage-generating portion, a coarse displacement means for bringing the optical waveguide probe close to a surface of a sample, an optical detection means consisting of lenses and a photodetector, a sample-to-probe distance control means consisting of a Z motion fine adjustment device and a Z servo circuit, a two-dimensional scanning means consisting of an XY fine motion device and an XY scanning circuit, and a data processing means for converting a measurement signal into a three-dimensional image. This microscope is characterized in that the optical waveguide probe is held to a quartz oscillator by spring pressure of a resilient body. Because of this structure, a near-field optical microscope having high resolution less than the wavelength and capable of measurement of locally excited light emission is provided. By imparting a means for cooling the sample to the scanning near-field optical microscope, a near-field optical microscope having high resolution less than the wavelength at low temperatures and capable of measurement of locally excited light emission is provided.

BRIEF DESCRIPTION OF THE DRAWINGS

FIG. 1 is a schematic view of a scanning near-field optical microscope in accordance with the present invention;

FIG. 5 is a schematic view of Embodiment 1 of a scanning near-field optical microscope in accordance with the present invention;

FIG. 7 is a schematic view of Embodiment 3 of a scanning near-field optical microscope in accordance with the present invention.

DETAILED DESCRIPTION OF THE INVENTION

Figure 2:
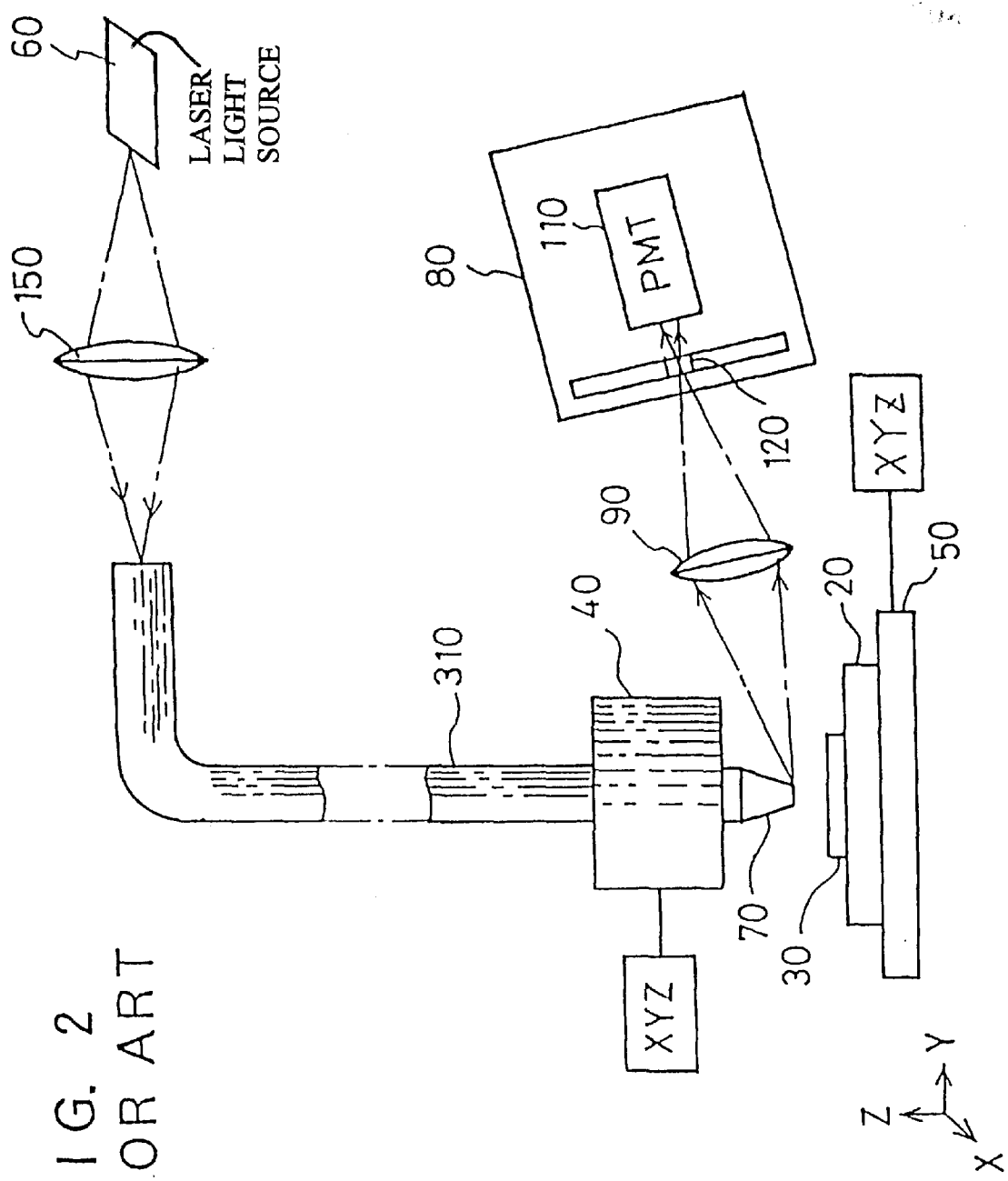
FIG. 2 is a schematic view of the prior art near-field scanning optical microscope.
Figure 3:
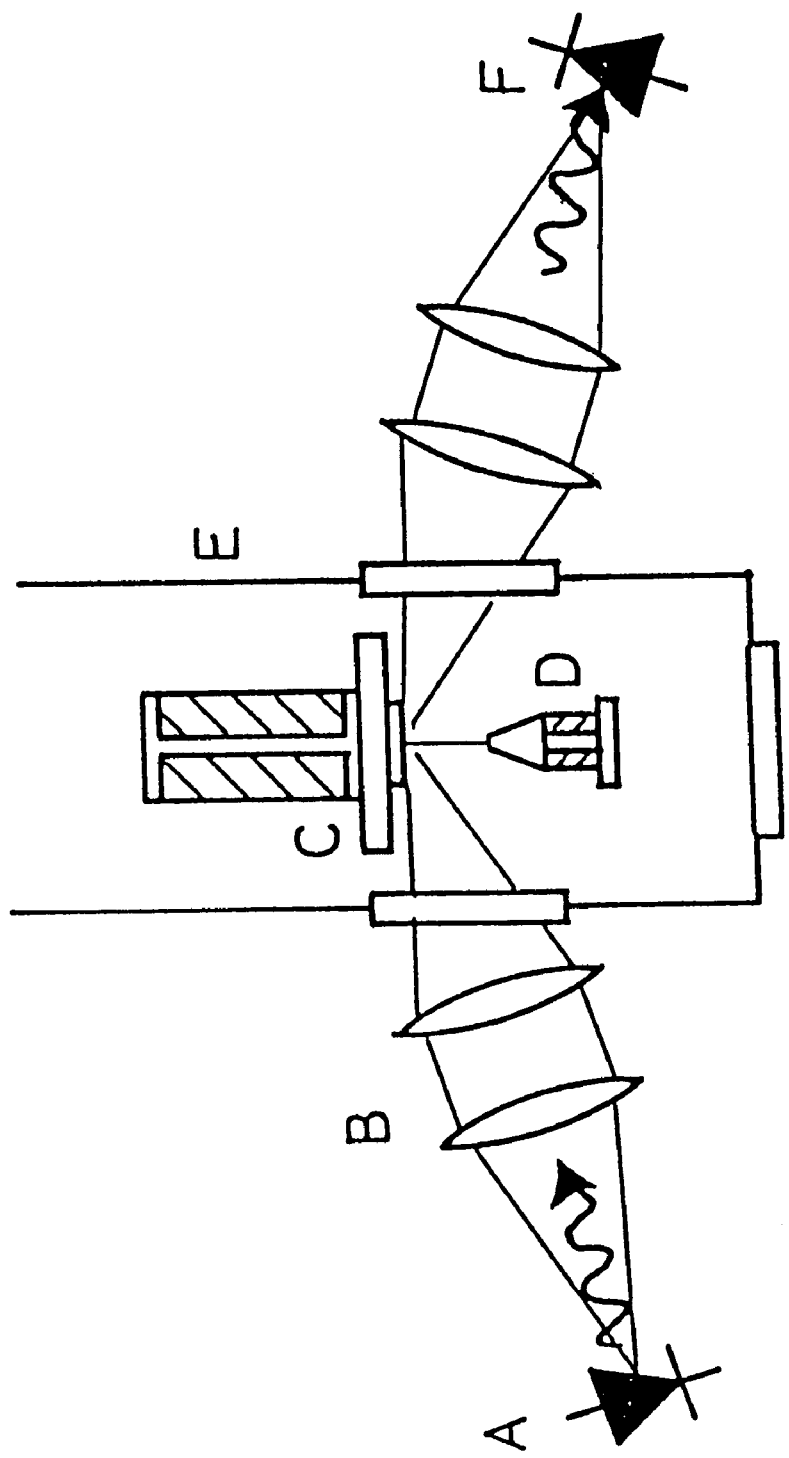
FIG. 3 is a schematic view of the prior art low-temperature scanning near-field optical microscope.
Figure 4:
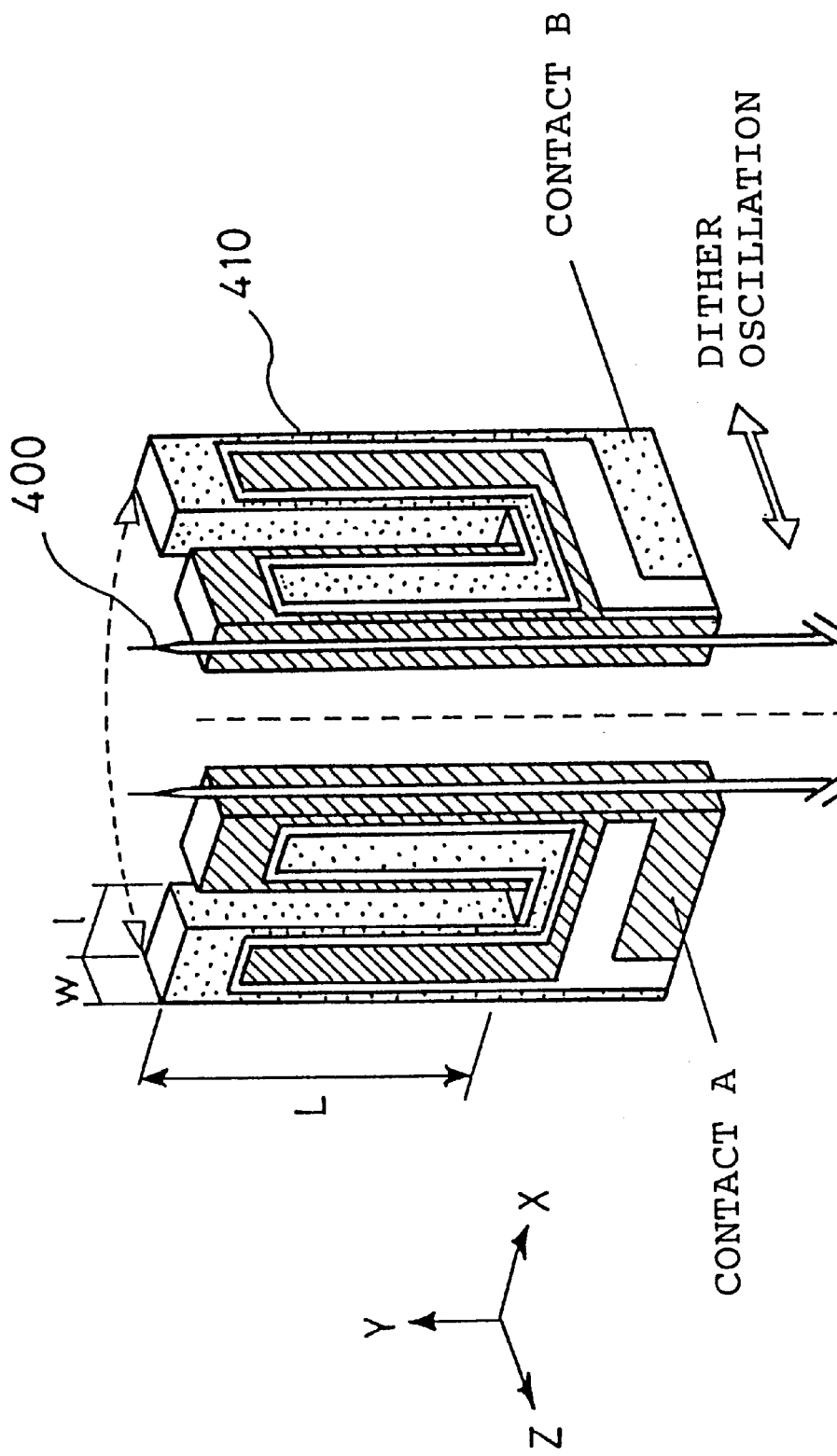
FIG. 4 is a schematic view of the prior art near-field optical microscope using a quartz oscillator.

FIG. 1 is a schematic view of a scanning near-field optical microscope in accordance with the present invention.

The scanning near-field optical microscope in accordance with the present invention comprises an optical waveguide probe 1, a vibration device, hereinafter referred to as a vibration application portion, consisting of a piezoelectric vibrating body 2 and an AC voltage-generating means 3, a vibration detecting device, hereinafter referred to as a vibration-detecting portion, consisting of a quartz oscillator 4 and a current/voltage amplifier circuit 5, a coarse displacement means 6 for bringing the optical waveguide probe close to the sample surface, an optical detecting means consisting of lenses 7, 8 and a photodetector 9, a sample-to-probe distance control means consisting of a Z-axis fine motion device 11 and a Z servo circuit 12, a two-dimensional scanning means consisting of an XY fine motion device 13 and an XY scanning circuit 14, and a data processing means 15 for converting a measurement signal into a three-dimensional image. The probe 1 has a microscopic aperture portion at its tip, the aperture portion having a diameter less than the wavelength. A resilient body 16 produces spring pressure that holds the optical waveguide probe 1 to the quartz oscillator 4.

When the optical waveguide probe vibrating horizontally is brought close to the sample surface, a shear force acts on the tip of the probe. This reduces the amplitude of the vibration. The probe and the quartz oscillator are secured together by spring pressure and thus operate as a unit. Therefore, the decrease in the amplitude of the vibration of the probe results in a decrease in the amplitude of the vibration of the quartz oscillator. This in turn reduces the output current, which is detected by the current/voltage amplifier circuit. The distance between the sample and the probe is controlled with the Z-axis fine motion device and the Z servo circuit to maintain the output current from the quartz oscillator constant. In this way, the tip of the probe is kept at a constant distance from the sample surface. Under this condition, light for exciting the sample is introduced into the optical waveguide probe. A local region on the sample surface is illuminated with the light from the aperture at the tip of the probe, or light from the sample is picked up by the optical probe. The optical pickup is scanned in two dimensions across the sample plane to produce a three-dimensional image. Also, a means for cooling the sample is included. Thus, the scanning near-field optical microscope can operate at low temperatures.

The distance between the optical waveguide probe and the sample is controlled, using the amplitude of the vibration of the quartz oscillator as described above. This dispenses with a laser normally used for position control such as in a near-field scanning optical microscope (NSOM) or a low-temperature scanning near-field optical microscope. As a result, various problems can be circumvented. For example, if the position of the laser light and the amount of reflected light vary, the data would be made inaccurate. Fluctuation of helium gas or liquid helium would vary the laser light, modifying the data. Furthermore, the laser for position control is not directed at the sample surface. Hence, the background noise is not increased during near-field optical measurement. During spectroscopic measurement, light having the wavelength of the laser for position control is removed and so any optical fiber is made unnecessary. This assures a wide range of wavelengths for spectroscopic data. Furthermore, decreases in the amount of detected light are prevented; otherwise, the S/N of data would deteriorate. The spring pressure of the resilient body anchors the optical waveguide probe to the quartz oscillator. In the prior art near-field optical microscope using a quartz oscillator, data would be affected by the manner in which they are adhesively bonded. In exchanging the probe, it is only necessary to replace the probe. In consequence, the same quartz can be used. The reproducibility of the measurement conditions and the reproducibility of data can be enhanced. Moreover, the replacement of only the probe gives rise to lower cost. In addition, the adhesive bonding that is difficult to perform is made unnecessary. Consequently, the instrument is made very easy to handle. The incorporation of the means for cooling the sample accomplishes a scanning near-field optical microscope operating at low temperatures. The omission of the laser used for position control can enhance the accuracy of the data and the reproducibility. In addition, the S/N of spectroscopic data during near-field optical measurement under low-temperature conditions can be improved. In addition, the range of measured wavelengths can be extended.

Embodiments

Embodiments of this invention are hereinafter described.

First Embodiment

FIG. 5 is a schematic view of Embodiment 1 of a scanning near-field optical microscope in accordance with the invention. This embodiment gives a transmission-type scanning near-field optical microscope operating at low temperatures.

A quartz oscillator 4 and a piezoelectric oscillator 2 are bonded to a quartz oscillator holder 25 with adhesive. A PZT device in the form of a flat plate is used as the piezoelectric oscillator. A quartz oscillator used for a clock or watch is used as the aforementioned quartz oscillator. When an AC voltage is applied to the PZT device, it vibrates, forcing the quartz oscillator to vibrate. If the vibration frequency is made coincident with the resonant frequency (e.g., 32.7 kHz), the quartz oscillator resonates. Then, piezoelectric effect induces an electric charge on the electrodes of the quartz oscillator. The resulting current is detected by a current/voltage amplifier circuit. Since a current proportional to the amplitude of the vibration of the quartz oscillator is produced, the state of the vibration of the quartz oscillator can be measured from the detected current. A cylindrical PZT scanner, a laminated PZT plate, or other structure may be conceivable as the piezoelectric oscillator, as well as the PZT plate. All of them are embraced by the present invention. Furthermore, quartz oscillators used in applications other than clocks and watches may be used as the aforementioned quartz oscillator in accordance with the present invention.

An optical waveguide probe 1 is held to a quartz oscillator by spring pressure of a resilient body 16. The used optical waveguide probe is prepared by chemically etching the tip of a single-mode optical fiber, machining it into a tapering form, and then tapering the thin aluminum film except for an aperture portion at the tip. It may be conceivable that a multimode optical fiber or glass pipette machined into a tapering form is used as the optical waveguide probe. This is embraced by the present invention. The method of machining the fiber or pipette into a tapering form may include mechanical polishing and heating-and-elongating processing, as well as the chemical etching. It is conceivable that the thin metal coating is made of a noble metal (such as gold or platinum), a multilayer film, a thin alloy metal, or the like, as well as aluminum. All of them are embraced by the present invention. The aperture is formed so that it is less than the wavelength of light used for measurement. In the present invention, an aperture less than 100 nm was formed. Where a large amount of light is necessary, the aperture is preferably increased to about 150 to 200 nm. On the other hand, where high resolution is needed, 20–50 nm is desirable. It is conceivable that a size of 20–306 nm is used. All of them are embraced by the present invention. A leaf spring made of a stainless steel is used as the resilient body. Since the sensitivity of the quartz oscillator to forces is high, it is desired that the spring constant of the resilient body be small. In the present invention, a cantilever spring having a thickness of 100 m, a width of 1 mm, and a length of 10 mm is used. Besides, the resilient body may be a leaf spring of phosphor bronze, a coiled spring, various kinds of rubber such as silicone rubber. All of them are embraced by the present invention. Furthermore, the body may be held by making use of the resilience of the optical waveguide probe itself. This is also embraced by the invention. Where the body is held by spring pressure, this pressure is measured, utilizing the oscillating characteristics of a quartz oscillator, i.e., Q-value. Where the optical waveguide probe is not held, the Q-value of the quartz oscillator is about 3000, for example. Where the optical waveguide probe is held with a spring, the Q-value is less than 500. A Q-value preferable for the scanning near-field optical microscope is approximately 100 to 400. The spring pressure is adjusted so that the Q-value falls within this range.

The quartz oscillator holder 25 is held to XYZ fine motion devices 11 and 13. A cylindrical piezoelectric device in which X-, Y-, and Z-axis scanners are combined into a unit is used as each fine motion device. Besides, a piezoelectric scanner in which Z-axis is separate from X-and Y-axes and electrostrictive devices may be conceivable as the fine motion devices. These are embraced by the invention. Other conceivable structures include piezo-stages, stages using parallel stages, tripod-type piezoelectric devices in which one-axis piezoelectric devices are mounted on X-, Y-, and Z-axes, respectively, and laminar piezoelectric scanners.

A coarse displacement means 6 is used to bring the optical waveguide probe close to a sample 17. A semiconductor thin film producing photoluminescence is used as the sample. Other. samples can be inorganic thin films, biological samples, and organic thin films transmitting light. The sample can be prepared (i) by vacuum evaporation, (ii) by dispersing a sample in the form of fine particles in a volatile solvent and stretching the sample onto a glass surface, or (iii) by CVD. A coarse displacement means consisting of a stepping motor and a speed-reduction gear, a rough motion screw, or a linear guide is used as the above-described coarse displacement means. Other example of the coarse displacement means may consist of a Z stage to which a stepping motor is added. A further example includes a stage using piezoelectric devices. For instance, it is a stage in which an inchworm mechanism or Z stage is combined with a piezoelectric device. All of them are embraced by the present invention.

Laser light emitted from a laser light source 19 is focused by a lens 21 and introduced into the optical waveguide probe 1. The laser light emerges from the aperture at the tip of the probe 1 and illuminates the sample 17. An argon ion laser having a wavelength of 488 nm is used as the laser light source. The sample is excited with the laser light and made to emit by photoluminescence. This emission occurs only in the vicinity of the aperture at the tip of the probe. The light is focused by a lens 7, a mirror 22, and a lens 8. It is conceivable that the lens is a combinatorial lens, as well as a simple lens. All of them are embraced by the present invention. A photomultiplier is used as the photodetector. Other conceivable examples include CCD device, silicon photodiode, silicon avalanche photodiode, and germanium detector. All of them are embraced by the present invention. A signal from the photodetector 9 is applied to a data processing means 15, together with XY scanning signals. Thus, a three-dimensional image is created. A computer and a CRT display are used as the data processing means. Various other methods are conceivable. For example, it may be a combination of a storage oscilloscope, a computer, and a liquid display. All of them are embraced by the present invention.

The sample temperature was cooled down close to liquid helium temperature (e.g., 5 K), using a cryostat 18. Optical measurement is performed through an optical window 24 of the cryostat. The used cryostat has a cooling mechanism employing helium gas flow. Therefore, the sample temperature can be cooled down to liquid helium temperature from room temperature in a short time (about 30 minutes). Other conceivable means for cooling the sample include (i) cooling a metal such as copper and bringing it into contact with the metal in vacuum to cool the sample and (ii) using a mechanical refrigerator making use of adiabatic expansion of liquid helium. All of them are embraced by the present invention. Using the structure described thus far, the sample temperature is cooled down close to liquid helium temperature. Under this condition, laser light is directed at the sample surface from the aperture of the optical waveguide probe less than the wavelength to induce light emission by photoluminescence. The light is gathered by the lenses and detected by the photodetector. The distribution of light emission within the sample plane can be measured with a high resolution less than the wavelength.

Embodiment 2

Figure 6:
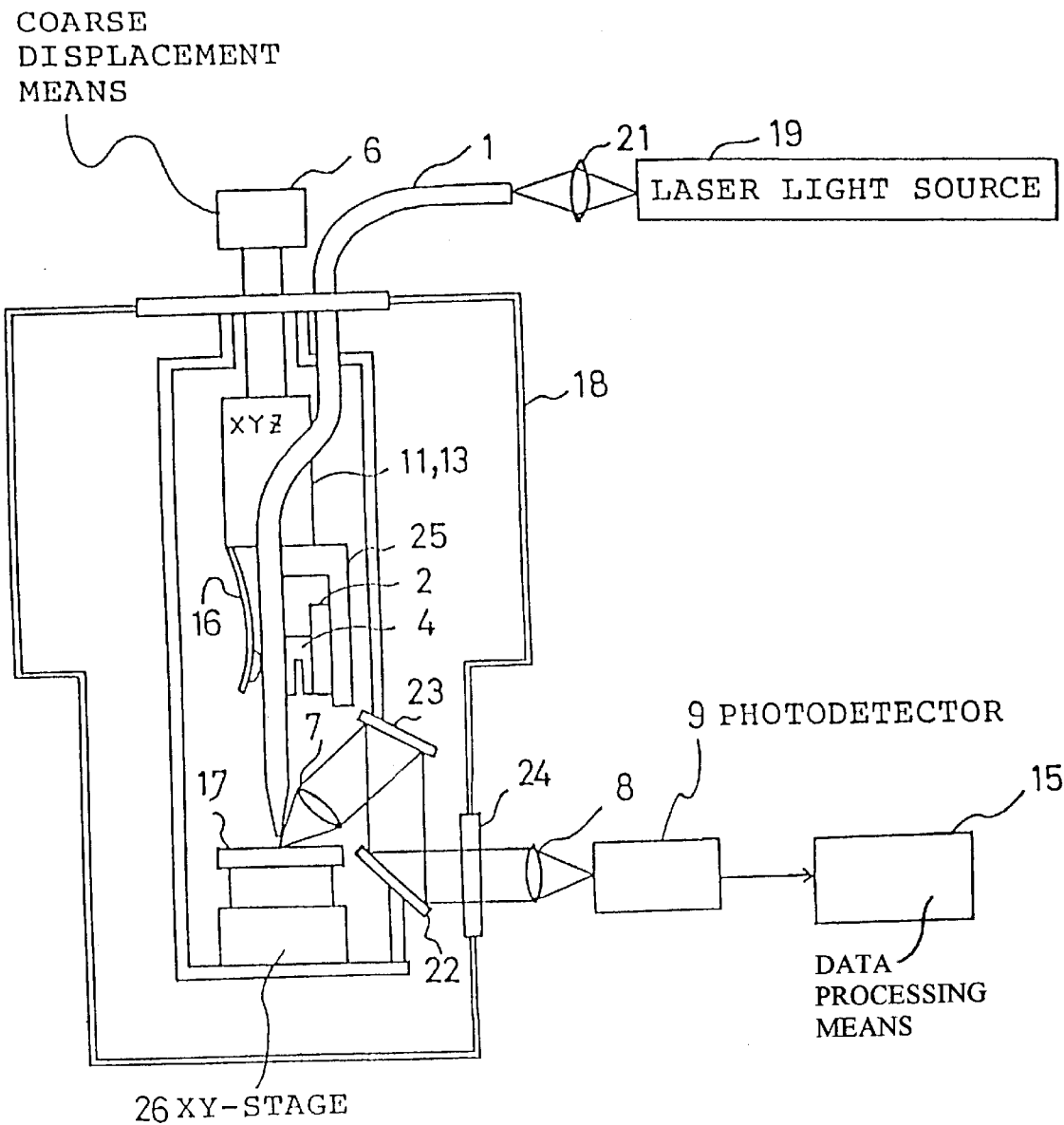
FIG. 6 is a schematic view of Embodiment 2 of a scanning near-field optical microscope in accordance with the present invention.

FIG. 6 is a schematic view of Embodiment 2 of a scanning near-field optical microscope in accordance with the present invention. The described embodiment is a reflection-type scanning near-field optical microscope operated at low temperatures.

A laser light source 19 is introduced into the optical waveguide probe 1 by a coupling 21. Light is directed at the sample 17 from the aperture at the tip of the optical waveguide. Luminescent light from the sample is focused by a lens 8 via a lens 7, mirrors 23, 22, and an optical window 24. The light is detected by a photodetector 9. A data processing means 15 creates a three-dimensional image. The measured region on the sample surface is moved, using an XY stage 26 for the sample. A piezoelectrically driven XY stage is used as this XY stage. Other conceivable XY stage is a stage consisting of a combination of a stepping motor and an XY stage. All of them are embraced by the present invention. Other structures are the same as the contents of Embodiment 1. In this configuration described thus far, laser light is directed from the aperture of the optical waveguide less than the wavelength while cooling the sample temperature down close to liquid helium temperature. Light emission is induced by photoluminescence. The light is gathered by lenses and detected by a photodetector. The distribution of light emission within the sample plane can be measured with high resolution less than the wavelength.

Embodiment 3

FIG. 7 is a schematic view of Embodiment 3 of a scanning near-field optical microscope in accordance with the present invention. The illustrated embodiment is a reflection-type scanning near-field optical microscope operated at low temperatures.

Light emitted from a light source 19 is amplitude-modulated periodically by an optical modulator 27 consisting of an acoustooptical (AO) modulator. Other conceivable optical modulators include an optical modulator (EO modulator) using an electric field and mechanical modulators in which an optical chopper is rotated by an electric motor. All of them are embraced by the present invention. The modulated laser light is introduced into the optical waveguide probe 1 by a coupling 21. The light is directed at the sample 17 from the aperture at the tip of the optical waveguide probe. Luminescent light from the sample is gathered by a lens 8 via a lens 7, mirrors 23, 22, and an optical window 24. The light is then split into two beams traveling in two directions by a half-mirror 31. The split light beams are measured by a photodetector 9 and a spectrometer 29. In some cases, the half-mirror may be replaced by a dichroic mirror. To secure sufficient amount of light for spectroscopic applications, it may be possible to use no mirrors. The light detected by the photodetector 9 is measured with high SIN, using a lock-in amplifier. The resulting signal is converted into a three-dimensional image by a data processing means 15. The measured region on the sample surface is moved, using an XY stage 26 for the sample. A piezoelectrically driven stage is used as this XY stage. Other conceivable XY stage may be an XY stage in which a stepping motor is combined with an XY stage. This is also embraced by the present invention. This embodiment is similar to the contents of the Embodiment 1 in other respects.

In the structure described above, laser light was directed at the sample surface from the aperture of the optical wavelength less than the wavelength while the sample temperature was cooled down close to liquid helium temperature. Emission of light was induced by photoluminescence. The light was gathered by lenses and detected by the photodetector. The distribution of light emission within the sample plane could be measured with a high resolution less than the wavelength by scanning the optical waveguide probe across the sample plane.

As described thus far, this invention comprises: an optical waveguide probe provided with a microscopic aperture portion of a diameter less than a wavelength at its tip, a vibration application portion consisting of a piezoelectric vibrating body 2 and an AC voltage-generating portion 3, a vibration-detecting means consisting of a quartz oscillator 4 and a current/voltage amplifier circuit 5, a coarse displacement means 6 for bringing the optical waveguide probe close to a surface of a sample, an optical detection means consisting of lenses 7, 8 and an optical detector 9, a sample-to-probe distance control means consisting of a Z motion fine adjustment device 11 and a Z servo circuit 12, a two-dimensional scanning means consisting of an XY fine motion device 13 and an XY scanning circuit 14, and a data processing means 15 for converting a measurement signal into a three-dimensional image. The optical waveguide probe 1 is held to the quartz oscillator 4 by spring pressure of a resilient body 16.

As described above, the distance between the optical waveguide probe and the sample is controlled, using the amplitude of the vibration of the quartz oscillator. This dispenses with a laser used for position control, the laser being used in a near-field scanning electron microscope (NSOM) and in a low-temperature scanning near-field optical microscope. It is possible to avoid various problems, such as inaccuracies of data due to variations of the position of laser light and variations in the amount of reflected light and change of data due to variations of laser light attributed to fluctuations of helium gas or liquid helium. Furthermore, the background noise is not increased during near-field optical measurement, because the sample surface is not illuminated with laser for position control. During spectroscopic measurement, any optical fiber for removing the light of the wavelength of the position control laser is made unnecessary. This assures a wide range of wavelengths for spectroscopic data. Furthermore, decreases in the amount of detected light are prevented; otherwise, the S/N of data would deteriorate. The spring pressure of the resilient body holds the optical waveguide probe to the quartz oscillator. In the prior art near-field optical microscope using a quartz oscillator, data would be affected by the manner in which they are adhesively bonded. In exchanging the probe, it is only necessary to replace the probe. In consequence, the same quartz oscillator can be used. The reproducibility of the measurement conditions and the reproducibility of data can be enhanced. Moreover, the replacement of only the probe gives rise to lower cost. In addition, the adhesive bonding that is difficult to perform is made unnecessary. Consequently, the instrument is made very easy to handle. The incorporation of the means for cooling the sample accomplishes a scanning near-field optical microscope operating at low temperatures. The omission of the laser used for position control can enhance the accuracy of the data and the reproducibility. Also, the S/N of spectroscopic data during near-field optical measurement under low-temperature conditions can be improved. In addition, the range of measured wavelengths can be extended.

What is claimed is:

1. A scanning near-field optical microscope comprising: an optical waveguide probe having at a tip thereof a microscopic aperture portion of a diameter less than a wavelength; a vibration device having a piezoelectric vibrating body and an AC voltage generator for vibrating the optical waveguide probe relative to a surface of a sample; a vibration detecting device having a quartz oscillator and a current/voltage amplifier circuit for detecting vibration of the probe; a resilient body for biasing the optical waveguide probe into pressure contact with the quartz oscillator; a coarse displacement device for effecting coarse displacement of the optical waveguide probe in a direction to bring the optical waveguide probe close to the surface of the sample; an optical detection device having lenses and a photodetector for detecting light from the sample; a sample-to-probe distance control device having a fine displacement adjustment device and a servo circuit for effecting fine displacement of the probe in the Z direction; a two-dimensional scanning device having a fine displacement device and a scanning circuit for scanning the probe in X and Y directions; and a data processing device for converting a measurement signal from the photodetector into a three-dimensional image.

2. A scanning near-field optical microscope according to claim 1; further comprising means for cooling the sample.

3. scanning near-field optical microscope according to claim 2; wherein the means for cooling the sample comprises a cryostat having liquid helium as a freezing medium.

4. A scanning near-field optical microscope according to claim 3; further comprising a laser light source for introducing laser light into the optical waveguide probe to illuminate the sample surface locally from the tip of the optical waveguide probe.

5. A scanning near-field optical microscope according to claim 4; further comprising means for periodically modulating the laser light illuminated on the sample surface, and lock-in detecting means for measuring the light detected by the photodetector.

6. A scanning near-field optical microscope according to claim 4; further comprising a sample stage for moving a measurement position on the sample surface.

7. A scanning near-field optical microscope according to claim 4; further comprising lenses for collecting light either transmitted through the sample or reflected from the sample surface; and wherein the lenses are disposed in a sample chamber disposed within the cryostat.

8. A scanning near-field optical microscope according to claim 4; further comprising means for spectroscopically analyzing light emitted from the sample.

9. A scanning near-field optical microscope according to claim 1; wherein the resilient body is provided for biasing the optical waveguide probe into pressure contact with the quartz oscillator without using an adhesive.

10. A scanning near-field optical microscope according to claim 1; wherein the resilient body comprises a spring.

11. A scanning near-field optical microscope according to claim 10; wherein the spring comprises one of a leaf spring and a coil spring.

12. A scanning near-field optical microscope according to claim 10; wherein the spring comprises a leaf spring having a thickness of 100 nm, a width of 1 mm and a length of 10 mm.

13. A scanning near-field optical microscope according to claim 10; wherein a Q value of the spring is less than 500.

14. A scanning near-field optical microscope according to claim 10; wherein a Q value of the spring is within the range of about 100–400.

15. A scanning near-field optical microscope according to claim 1; wherein the resilient body comprises a rubber member.

16. A scanning near-field optical microscope according to claim 1; wherein the quartz oscillator comprises a tuning fork of the type used in an electronic timepiece.

17. A scanning near-field optical microscope according to claim 1; wherein the piezoelectric oscillator comprises a PZT plate.

18. A scanning near-field optical microscope according to claim 1; wherein the piezoelectric oscillator comprises one of a cylindrical a PZT scanner and a laminated PZT plate.

19. A scanning near-field optical microscope according to claim 1; wherein the optical waveguide probe comprises an optical fiber.

20. A scanning near-field optical microscope according to claim 19; wherein the optical fiber comprises one of a single mode optical fiber and a multi-mode optical fiber.

21. A scanning near-field optical microscope according to claim 1; wherein the optical waveguide probe comprises a glass pipette.

22. A scanning near-field optical microscope according to claim 1; wherein the aperture is less than 100 nm.

23. A scanning near-field optical microscope according to claim 1; wherein the aperture is within the range of about 150–200 nm.

24. A scanning near-field optical microscope according to claim 1; wherein the aperture is within the range of about 20–50 nm.

25. A scanning near-field optical microscope according to claim 1; wherein the aperture is within the range of about 20–300 nm.

26. A scanning near-field optical microscope comprising: an optical waveguide probe having at a tip thereof a microscopic aperture portion of a diameter less than a wavelength; a vibration device having a piezoelectric vibrating body and an AC voltage generator for vibrating the optical waveguide probe relative to a surface of a sample; a vibration detecting device having a quartz oscillator and a current/voltage amplifier circuit for detecting vibration of the probe, the optical waveguide probe being adhesively bonded to the quartz oscillator; a cryostat for cooling the sample; a coarse displacement device for effecting coarse displacement of the optical waveguide probe in the Z direction to bring the optical waveguide probe close to the surface of the sample; an optical detection device having lenses and a photodetector for detecting light from the sample; a sample-to-probe distance control device having a fine displacement adjustment device and a servo circuit for effecting fine displacement of the probe in the Z direction; a two-dimensional scanning device having a fine displacement device and a scanning circuit for scanning the probe in X and Y directions; a data processing device for converting a measurement signal from the photodetector into a three-dimensional image; and lenses for collecting light either transmitted through the sample or reflected from the sample surface, wherein the lenses are disposed in a sample chamber disposed within the cryostat.

27. A scanning near-field optical microscope according to claim 26; wherein the cryostat uses liquid helium as a freezing medium.

28. A scanning near-field optical microscope according to claim 27; further comprising a laser light source for introducing light into the optical waveguide probe to illuminate the sample surface locally from the tip of the optical waveguide probe.

29. A scanning near-field optical microscope according to claim 28; further comprising means for periodically modulating the laser light illuminated on the sample surface, and lock-in detecting means for measuring the light detected by the photodetector.

30. A scanning near-field optical microscope according to claim 28; further comprising a sample stage for moving a measurement position on the sample surface.

31. A scanning near-field optical microscope according to claim 28; further comprising lenses for collecting light either transmitted through the sample or reflected from the sample surface; and wherein the lenses are disposed in a sample chamber disposed within the cryostat.

32. A scanning near-field optical microscope according to claim 28; further comprising means for spectroscopically analyzing light emitted from the sample.

33. A scanning near-field optical microscope according to claim 26; wherein the quartz oscillator comprises a tuning fork of the type used in an electronic timepiece.

34. A scanning near-field optical microscope according to claim 26; wherein the piezoelectric oscillator comprises a PZT plate.

35. A scanning near-field optical microscope according to claim 26; wherein the piezoelectric oscillator comprises one of a cylindrical PZT scanner and a laminated PZT plate.

36. A scanning near-field optical microscope according to claim 26; wherein the optical waveguide probe comprises an optical fiber.

37. A scanning near-field optical microscope according to claim 36; wherein the optical fiber comprises one of a single mode optical fiber and a multi-mode optical fiber.

38. A scanning near-field optical microscope according to claim 26; wherein the optical waveguide probe comprises a glass pipette.

39. A scanning near-field optical microscope according to claim 26; wherein the aperture is less than 100 nm.

40. A scanning near-field optical microscope according to claim 26; wherein the aperture is within the range of about 150–200 nn.

41. A scanning near-field optical microscope according to claim 26; wherein the aperture is within the range of about 20–50 nm.

42. A scanning near-field optical microscope according to claim 26; wherein the aperture is within the range of about 20–300 nm.

43. A scanning probe microscope comprising: an optical waveguide probe extending in a Z direction; vibrating means for vibrating the probe relative to a surface of a sample; vibration detecting means for detecting the probe vibration; biasing means for biasing the probe into pressure contact with the vibration detecting means; optical detection means for detecting light from the sample; means for effecting coarse displacement of the probe in the Z direction; means for effecting fine displacement of the probe in the Z direction; means for scanning the probe in X and Y directions relative to the surface of the sample; and processing means for processing a measurement signal from the optical detection means into a three-dimensional image.

44. A scanning probe microscope according to claim 43; wherein the vibration detecting means comprises a quartz oscillator; and wherein the probe is integrally connected to the quartz oscillator by the pressure applied by the biasing means.

45. A scanning probe microscope according to claim 44; wherein the biasing means comprises a leaf spring.

46. A scanning probe microscope according to claim 43; wherein the biasing means includes means for biasing the probe into pressure contact with the vibration detecting means without using an adhesive.

47. A scanning probe microscope comprising: an optical waveguide probe extending in a Z direction; vibrating means for vibrating the probe relative to a surface of a sample; a vibration detecting device having a quartz oscillator for detecting vibration of the probe, the probe being adhesively bonded to the quartz oscillator; a cryostat for cooling the sample; means for effecting coarse displacement of the probe in the Z direction; optical detection means for detecting light from the sample; means for effecting fine displacement of the probe in the Z direction; means for scanning the probe in X and Y directions relative to the surface of the sample; processing means for processing a measurement signal from the optical detection means into a three-dimensional image; and lenses for collecting light either transmitted through the sample or reflected from the sample surface, wherein the lenses are disposed in a sample chamber disposed within the cryostat.

48. A scanning probe microscope according to claim 47; wherein the cryostat uses liquid helium as a cooling medium.

49. A scanning probe microscope according to claim 48; further comprising a laser light source for introducing light into the optical waveguide probe to illuminate the sample surface locally from the tip of the optical waveguide probe.

50. A scanning probe microscope according to claim 49; further comprising means for periodically modulating the laser light illuminated on the sample surface, and lock-in detecting means for measuring the light detected by the optical detection means.

51. A scanning probe microscope according to claim 49; further comprising a sample stage for supporting thereon the sample and being movable to select a desired measurement position on the sample surface.

52. A scanning probe microscope according to claim 49; further comprising means for spectroscopically analyzing light emitted from the sample.

* * * * *